(12) United States Patent
Campbell et al.

(10) Patent No.: US 8,752,365 B2
(45) Date of Patent: Jun. 17, 2014

(54) METHOD FOR DOSING AN UREA BASED REDUCING AGENT INTO A GAS EXHAUST STREAM

(75) Inventors: John Campbell, St. Gallen (CH); Harald Hagin, Kreuzlingen (CH); Fritz Papst, Romanshorn (CH)

(73) Assignee: Iveco Motorenforschung AG, Arbon (CH)

( * ) Notice: Subject to any disclaimer, the term of this patent is extended or adjusted under 35 U.S.C. 154(b) by 0 days.

(21) Appl. No.: 13/261,306

(22) PCT Filed: Dec. 15, 2010

(86) PCT No.: PCT/EP2010/069723
§ 371 (c)(1),
(2), (4) Date: Jun. 1, 2012

(87) PCT Pub. No.: WO2011/073240
PCT Pub. Date: Jun. 23, 2011

(65) Prior Publication Data
US 2012/0263632 A1  Oct. 18, 2012

(51) Int. Cl.
*F01N 3/00* (2006.01)
(52) U.S. Cl.
USPC .............................................. 60/286; 60/295
(58) Field of Classification Search
CPC .............. F01N 3/2066; F01N 2610/02; F01N 2610/1453; Y02T 10/24
USPC .................................................. 60/286, 295
See application file for complete search history.

(56) References Cited

U.S. PATENT DOCUMENTS

| 6,444,177 B1 | 9/2002 | Muller et al. | |
|---|---|---|---|
| 2002/0116916 A1* | 8/2002 | Hofmann et al. | 60/282 |
| 2008/0155973 A1 | 7/2008 | Maruyama et al. | |
| 2008/0223022 A1* | 9/2008 | Amon et al. | 60/299 |
| 2009/0262599 A1* | 10/2009 | Kohrs et al. | 366/337 |

FOREIGN PATENT DOCUMENTS

| EP | 0555746 | 8/1993 |
|---|---|---|
| GB | 2416718 | 2/2006 |

\* cited by examiner

*Primary Examiner* — Thomas Denion
*Assistant Examiner* — Jason Shanske
(74) *Attorney, Agent, or Firm* — Stetina Brunda Garred & Brucker

(57) ABSTRACT

The present invention provides for a method for dosing an urea-based reducing agent into a exhaust gas stream generated from a combustion engine and addressed to an aftertreatment system, e.g. SCR or SCRT system. According to the method of the invention the gas exhaust stream is conveyed into a dosing housing which develops along a longitudinal axis. In particular the gas is conveyed by generating an annular inlet jet inclined with respect of said axis. The urea-based reducing agent is injected by generating, inside the housing, an urea-based reducing agent spray which is preferably coaxial to said axis of the housing.

9 Claims, 5 Drawing Sheets

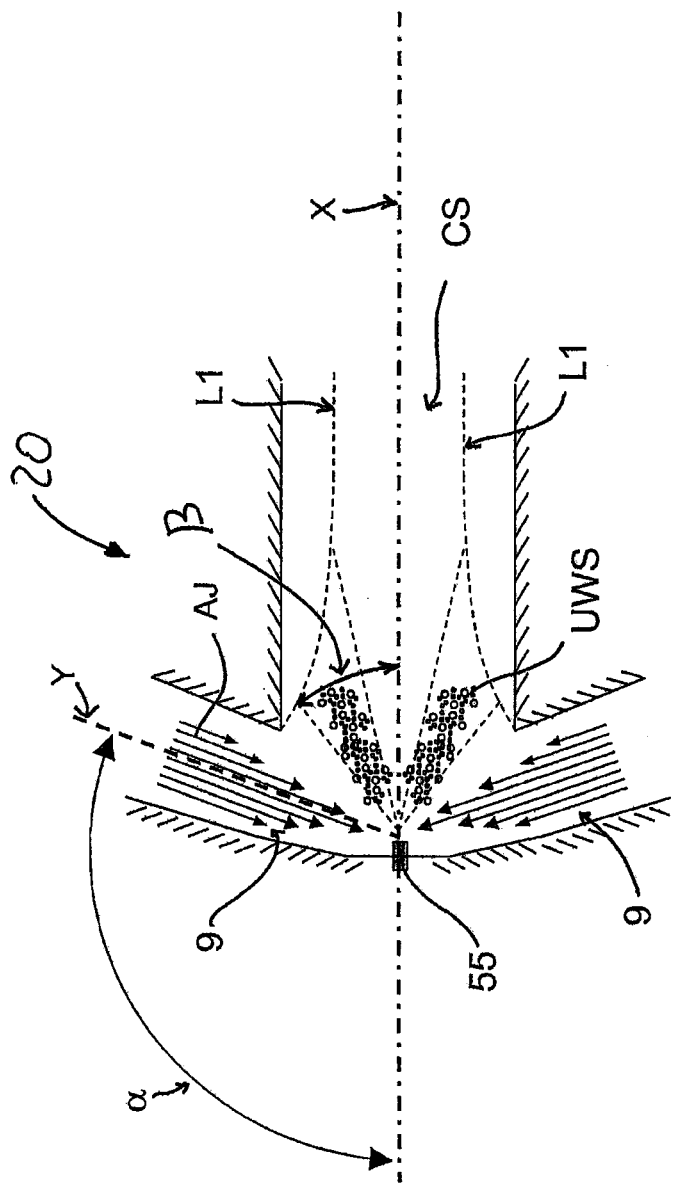

METHOD FOR DOSING AN UREA BASED REDUCING AGENT INTO A GAS EXHAUST STREAM

FIELD OF THE INVENTION

The present invention relates to a method for dosing an urea-based reducing agent (e.g. a solution of urea in water) into a gas exhaust stream generated from a combustion engine and addressed to an aftertreatment system (e.g SCR or SCRT device). The method according to the invention allows to improve the mixing of the reducing agent into gas exhaust stream and consequently to improve the catalyst efficiency of the aftertreatment device.

DESCRIPTION OF THE PRIOR ART

As it is know, a problem in the field of internal combustion engines, in particular with diesel engines, whether turbocharged or not, is the formation of nitrogen oxides during combustion. The nitrogen oxides are discharged with the engine exhaust gases and represent one of the main pollutants. In order to reduce the emissions of nitrogen oxides approximately up to 90%, selective catalyst reduction (SCR) devices have been developed. Depending on the particulate emission limits, these systems can be equipped with a particulate trap (SCRT System).

The functioning of SCR and SCRT device is based on the reaction, promoted by an appropriate catalytic unit, between the nitrogen oxides in the exhaust gases and ammonia specifically introduced as reducing agent. The ammonia is usually introduced in the form of a preferably liquid reagent able to release ammonia, under suitable temperature conditions or by the action of specific catalysts. The preferred source is usually urea in an aqueous solution, for example between 10 and 60% in weight, from which the ammonia is obtained by hydrolysis.

The urea is generally nebulized in a dosing module which is located upstream the SCR-SCRT system. FIG. 1 and FIG. 2 are examples of conventional arrangements for a dosing module. In particular, FIG. 1 shows a portion of an exhaust gas line comprising an SCR catalyst, a dosing module and a mixing device interposed between the dosing module and SCR catalyst. The mixing device has the function to promote and improve the mixing. The exhaust gas stream, coming from the engine, is axially introduced into the dosing module and the urea-solution is sprayed in the exhaust gas by an injector placed on the centerline (axis) of the housing of the dosing module. In the known solution shows in FIG. 2, urea-water solution is instead introduced in the dosing module by an injector inclined with respect to the direction of the exhaust gas stream. In other words, in the solution in FIG. 2, the reducing agent is injected laterally from a portion of the wall of the housing of the dosing module.

In FIG. 1 also reactions regarding urea-base reducing agent (e.g. urea-water solution) are indicated. After the atomization of said solution by spraying, the evaporation of water starts according to the reaction:

$$(NH_2)_2CO[aqueous] \rightarrow (NH_2)_2CO[solid] + 6.9 H_2O[gas]$$

After the evaporation of water the urea decomposition starts according to reactions:

$$(NH_2)_2CO[solid] \rightarrow NH_3[gas] + HNCO[gas]$$

$$HNCO[gas] + H_2O \rightarrow NH_3[gas] + CO_2+[gas]$$

The injection methods proposed by the solutions in FIGS. 1 and 2 have found to involve many drawbacks. In particular said methods do not allow a complete decomposition of urea (reactions relative to phase 3 in FIG. 1) and a uniform mixing of ammonia ($NH_3$[gas]) with the exhaust gas ($CO_2$[gas]). A non-uniform mixing disadvantageously reduces the efficiency of the SCR system.

In the solution shown in FIG. 1, incomplete decomposition of urea is due to the fact that the spray droplet size is fixed by nozzle characteristic and that the exhaust gas stream is axially introduced inside the dosing module housing. Consequently, after the atomization (phase 1) no further aerodynamic droplet break up occurs. Instead, in the solution of FIG. 2, the asymmetric installation of the injector generates an irregular urea-water spray distribution in the dosing module housing thus reducing the maximal possible NOx conversion rate.

Also it has to be noted that decomposition of urea-water solution, may cause formation of other products in particular isocyanic acid. This is an highly reactive compound that tends to form liquid deposits, such as liquid films, or solid deposits on the various parts of the exhaust system (e.g. pipes, deflectors, SCR-SCRT System). This is caused by contacting the reacting agent solution with cold surfaces such as for example the walls of the dosing module housing or those of the gas exhaust pipe.

The arrangements proposed in FIGS. 1 and 2 as well as the others known in the art, show an inconvenient strong spray-wall interaction. Consequently, known solutions do not allow to avoid the formation of liquid deposits on the sidewall of the dosing module housing.

SUMMARY OF THE INVENTION

Therefore it is the main object of the present invention to provide a method for dosing a reducing agent into a gas exhaust stream generated from a combustion engine and addressed to a aftertreatment system which allows to overcome the above mentioned problems/drawbacks.

Within this aim, a first object of the present invention is to provide a method for dosing a reducing agent into an exhaust gas stream which allows a complete urea decomposition and an uniform mixing of ammonia with the exhaust gas.

Another object of the present invention is to provide a method for dosing a reducing agent into an exhaust gas stream which avoids the interaction downstream the injection position between the reducing agent and cold walls of the exhaust gas system (e.g. dosing module walls, exhaust gas walls, aftertreatment system walls).

Not the last object of the present invention is to provide a method which is highly reliable and relatively easy to perform at competitive costs.

These and further objects are achieved by a method as described in the attached claims which form an integral part of the present description. In particular according to the method of the invention, said exhaust gas is conveyed into an dosing module housing which develops along a longitudinal axis. In particular the exhaust gas is conveyed by generating an annular inlet jet inclined with respect to the axis of the dosing housing. Moreover according to the method of the invention, the urea-based reducing agent is dosed by generating an urea-based reducing agent spray which is preferably coaxial to said axis of the housing.

BRIEF DESCRIPTION OF THE DRAWINGS

The invention will become fully clear from the following detailed description, given by way of a mere illustrative and non limiting example, to be read with reference to the attached drawing Figures, wherein:

FIG. 5 shows schematically a second arrangement for a dosing module which allows to perform the method according to the invention.

DETAILED DESCRIPTION OF THE PREFERRED EMBODIMENTS

The present invention relates to a method for dosing an urea-based reducing agent into an exhaust gas stream generated from a combustion engine, for example a diesel engine. For the purposes of the present invention, by the expression "urea based reducing agent" it is meant an urea-based solution, e.g. water-urea solution, able to develop ammonia when injected in an exhaust gas current addressed to a after-treatment device such as, for example, an SCR or SCRT device.

Figure 1:
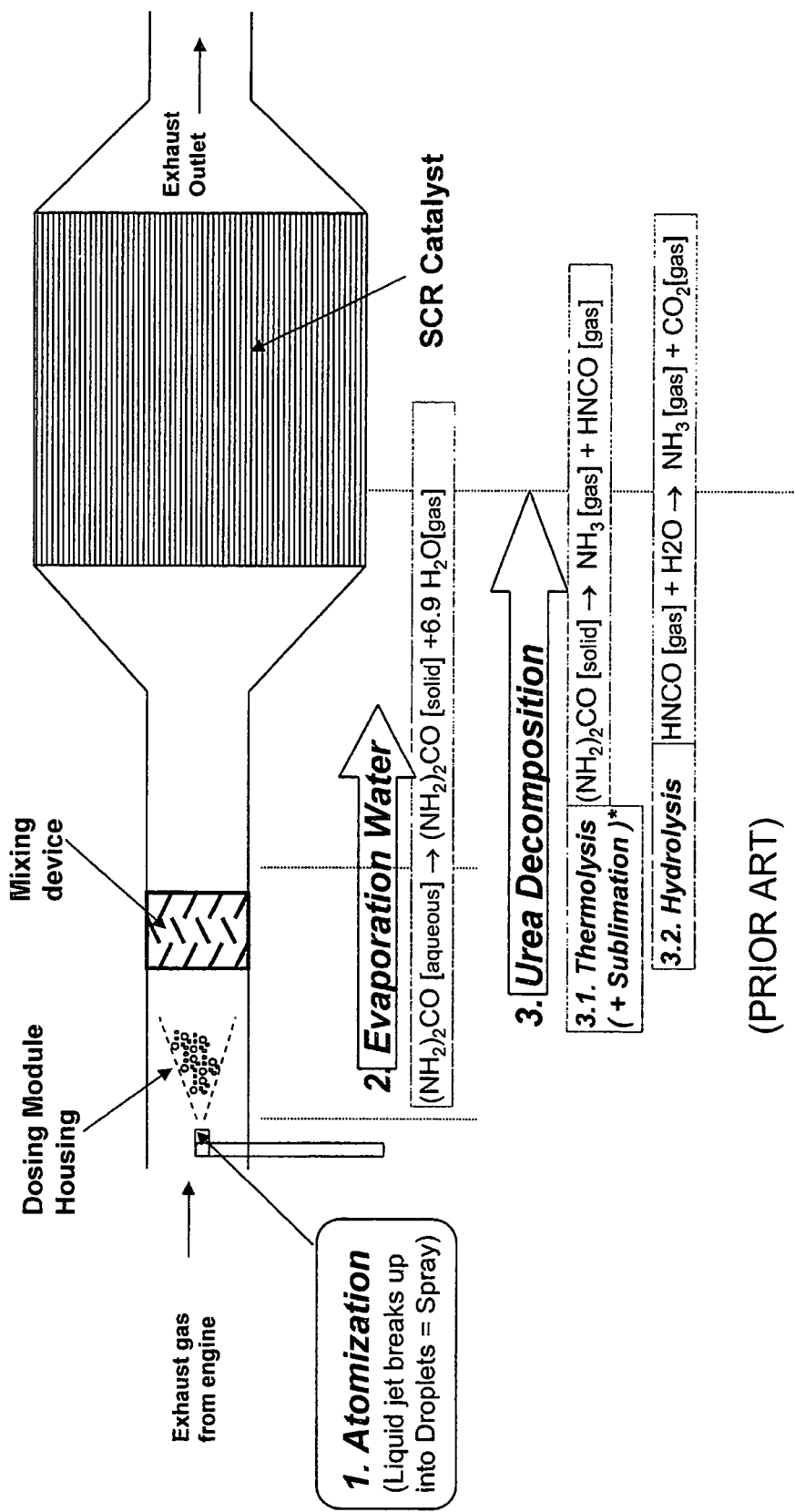
FIGS. 1 and 2 show conventional arrangements of a dosing housing used for dosing an urea based reducing agent in a dosing module crossed by an exhaust gas stream.
Figure 2:
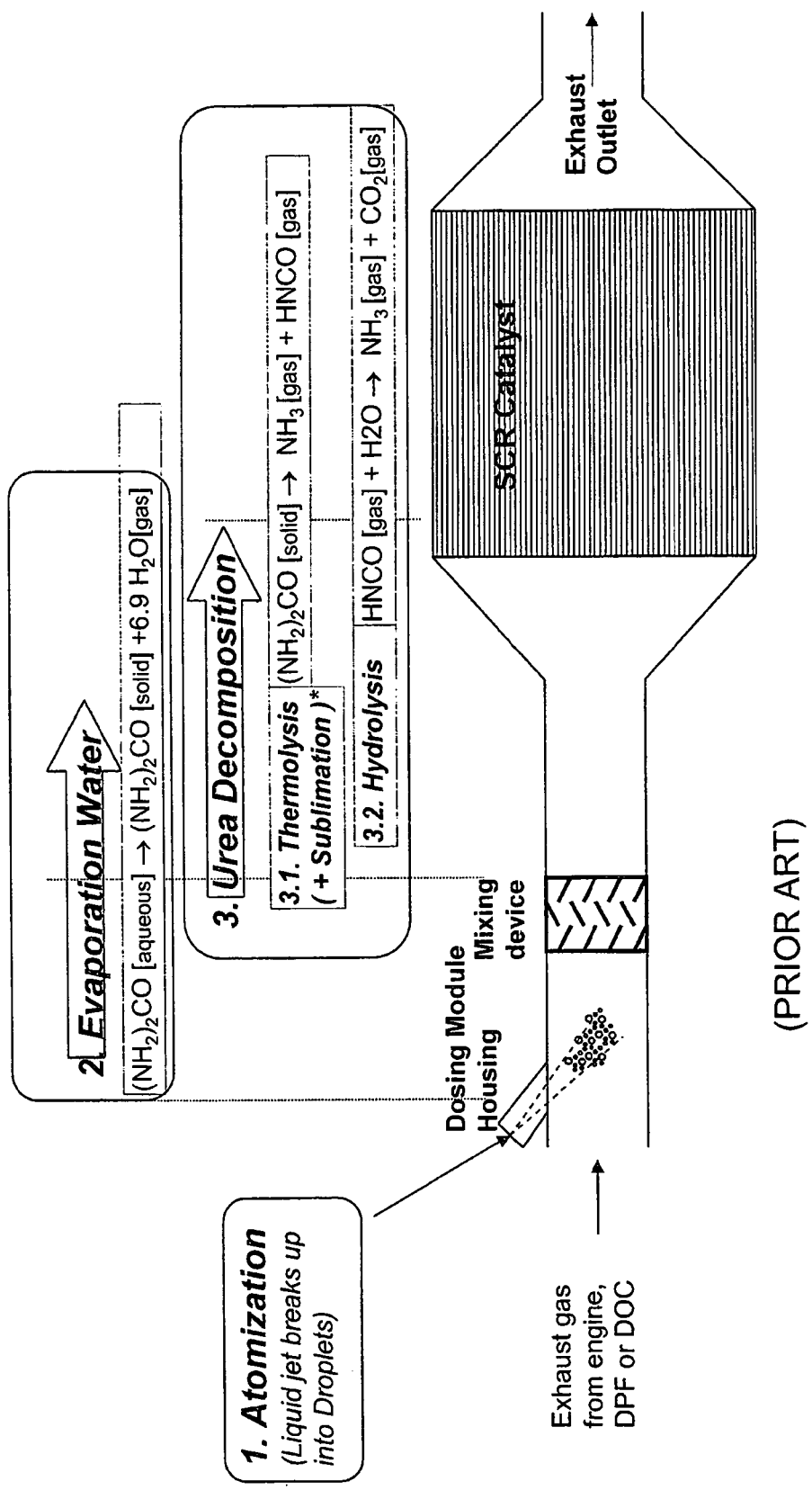
Figure 3:
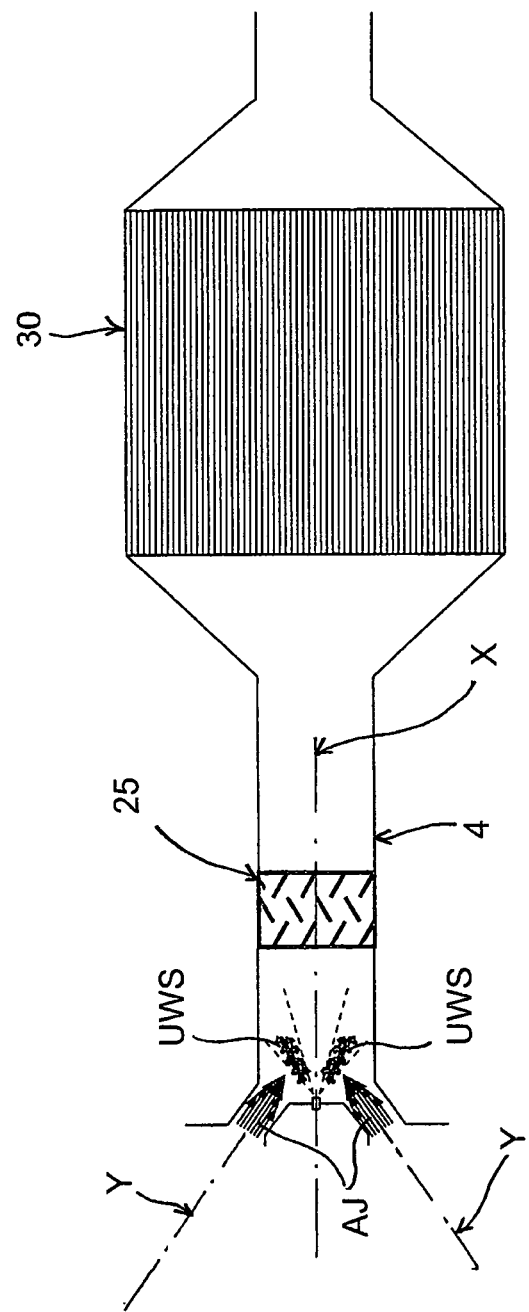
FIGS. 3 and 4 show schematically a first arrangement for a dosing module which allows to perform the method according to the invention.

The method according to the invention comprises a first step of providing a dosing module having a dosing housing 20 which develops along an axis X (also indicated with longitudinal axis X). In this regard, FIG. 3 shows an exhaust gas system of a combustion engine provided with an exhaust pipe 4 and a dosing module which is located upstream to a mixing device 25. The latter is in its turn located upstream a catalytic device 30 such as for example a SCR or a SCRT device. As illustrated the dosing housing 20 can be a part of the exhaust pipe 4 and can have preferably a circular cross section. For the purpose of the invention, by the expression "cross section" it is meant a section perpendicular to the axis X of the dosing housing 20.

According to the method of the invention, the exhaust gas stream coming from the engine is conveyed into said dosing housing 20 by generating an annular inlet jet (indicated with AJ) inclined with respect to the axis X. In other words, the exhaust gas is annularly introduced into the dosing module housing according to a inlet direction Y inclined to said axis X. In this way, the inlet exhaust gas stream presents a radial component perpendicular to the longitudinal axis X and an axial component which is parallel to the longitudinal axis itself.

Figure 4:
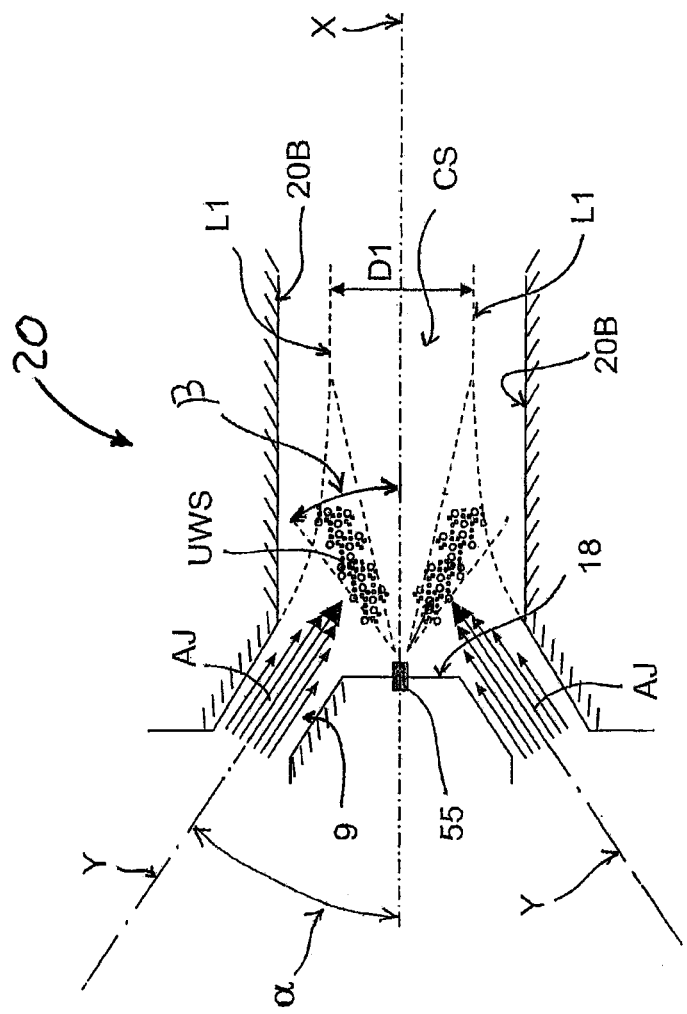

The method according to the invention also provides for dosing said urea-based reducing agent by generating a urea-based reducing agent spray (indicated with UWS) which is internal to the dosing housing 20 and preferably coaxial to the axis X of the housing itself. More in detail, the reducing agent is sprayed, by means of spraying means, so that the opening cone of the spray UWS is incident to the inlet direction Y of the annular inlet jet AJ of exhaust gas. As shown in FIGS. 3 and 4, the urea-based reducing agent spray UWS is generated so that spray cone opening angle faces the angle α between the inlet direction Y of said annular jet AJ and the axis X of said dosing housing 20.

FIG. 4 shows in detail the annular region of the dosing housing 20 where sprayed reducing agent is mixed to the annular inlet jet AJ. In this region, a strong turbulence is generated. This turbulence increases the droplet evaporation of the urea-based reacting agent and consequently increases the following urea particle decomposition. In this way, reaction rates are advantageously increased.

With reference again to FIG. 4, the annular inlet jet AJ allows to prevent the droplets of the spray from hitting the sidewalls 20B of the dosing housing 20. In fact, the spray droplets directed towards the sidewalls 20B are deflected inward the dosing housing 20 due to the inlet direction Y of the annular inlet jet AJ. In this way, the spray droplets can be flown in a central space (indicated with reference CS) of the dosing housing 20 without contacting the sidewalls 20B. In FIG. 4 said central space CS is schematized by the dashed lines L1. The diametral extension (indicated of D1) of this central space CS depends on the inlet speed of the annular jet AJ.

As shown in FIG. 4, the annular jet AJ is preferably conveyed by means of an annular inlet 9 communicating to the dosing housing 20 in proximity of an end transversal wall 18. Spray injection means preferably comprises a spray nozzle 55 placed on the center of the end wall 18. According to the invention the inlet jet AJ is inclined with respect to the longitudinal axis X of the dosing housing 20 of an angle α comprises between 30 and 150 degrees. In particular greatly significant results have been observed when said angle α is comprised between 30 and 90 degrees and when the reducing agent spray has an half-cone with an opening angle β comprised between 5 and 40 degrees.

FIG. 5 shows an alternative arrangement of a dosing module in which the annular inlet jet AJ is inclined with respect to the longitudinal axis X of the dosing housing 20 of an angle α greater than 90 degrees. In particular it has been observed that this arrangement advantageously avoids deposits near the nozzle 55.

It has been shown that the present invention achieves the aim and the objects as set forth above. More in detail, it has been shown that the method for dosing an urea-based reducing agent allows a complete decomposition and an uniform mixing of ammonia with the exhaust gas. Moreover, the method also avoids the formation of liquid deposit on the internal surface of the dosing housing and of the gas exhaust pipe.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. Method for dosing a urea-based reducing agent into a gas exhaust stream generated by a combustion engine and addressed to an after-treatment system (30), said method comprises the steps of:
   providing a dosing module having a dosing housing (20);
   conveying said gas exhaust stream into said dosing housing (20); and
   dosing said urea-based reducing agent by generating, inside said dosing housing (20), an urea-based reducing agent spray (UWS), characterizing in that said dosing housing (20) develops along an axis (X) and in that said gas exhaust stream is annularly introduced into said dosing housing (20) by defining an axially symmetric annular inlet jet (AJ) inclined with respect to said axis (X) of said dosing housing (20), wherein the annular inlet jet (AJ) is axially symmetrical about the axis (X) along which the dosing housing (20) develops.

2. Method according to claim 1, wherein said urea-based reducing agent spray (UWS) is generated so as to be coaxial to said axis (X).

3. Method according to claim 1, wherein said urea-based reducing agent spray (UWS) is generated by means of injection means comprising a nozzle (55) located inside said dosing housing (20).

4. Method according to claim 1, wherein said urea-based reducing agent spray (UWS) is generated so as to have an opening cone incident to the inlet direction (Y) of said annular inlet jet (AJ).

5. Method according to claim 4, wherein said urea-based reducing agent spray (UWS) is generated so as to have a spray half-cone opening angle (β) that faces the angle (α) between the inlet direction (Y) of said annular jet (AJ) and the axis (X) of said dosing housing (20).

6. Method according to claim 1, wherein said annular inlet jet (AJ) is inclined with respect to said axis (X) of said dosing housing (20) of an angle (α) comprised between 30 and 150 degrees.

7. Method according to claim 6, wherein said annular inlet jet (AJ) is inclined with respect to said axis (X) of said dosing housing (20) of an angle (α) comprised between 30 and 90 degrees.

8. Method according to claim 1, wherein said urea-based reducing agent spray is generated so as to have a half-cone opening angle (β) comprised between 5 and 40 degrees.

9. Method according to claim 1, wherein said urea-based reducing agent is formed by a solution of urea in water.

* * * * *